United States Patent
Aramaki

(10) Patent No.: US 9,547,700 B2
(45) Date of Patent: Jan. 17, 2017

(54) SEARCH SYSTEM, DISPLAY UNIT, RECORDING MEDIUM, APPARATUS, AND PROCESSING METHOD OF THE SEARCH SYSTEM

(71) Applicant: Hardis System Design Co., Ltd., Saitama (JP)

(72) Inventor: Toshimitsu Aramaki, Saitama (JP)

(73) Assignee: Hardis System Design Co., Ltd., Saitama (JP)

( * ) Notice: Subject to any disclaimer, the term of this patent is extended or adjusted under 35 U.S.C. 154(b) by 237 days.

(21) Appl. No.: 14/242,885

(22) Filed: Apr. 2, 2014

(65) Prior Publication Data

US 2014/0214811 A1    Jul. 31, 2014

Related U.S. Application Data

(63) Continuation-in-part of application No. PCT/JP2012/006211, filed on Sep. 27, 2012.

(30) Foreign Application Priority Data

Oct. 7, 2011    (JP) .................................. 2011-223306

(51) Int. Cl.
G06F 17/30    (2006.01)
G06F 11/07    (2006.01)

(52) U.S. Cl.
CPC ....... *G06F 17/30554* (2013.01); *G06F 11/079* (2013.01); *G06F 17/30654* (2013.01)

(58) Field of Classification Search
CPC .................... G06F 17/30654; G06F 17/30687; G06F 11/079
See application file for complete search history.

(56) References Cited

U.S. PATENT DOCUMENTS

2002/0040363 A1    4/2002    Wolfman et al.

FOREIGN PATENT DOCUMENTS

| JP | S62-004663 A | 1/1987 |
| JP | 2000-76071 A | 3/2000 |
| JP | 2002-341987 A | 11/2002 |
| JP | 2005-011042 A | 1/2005 |

(Continued)

OTHER PUBLICATIONS

International Preliminary Report on Patentability for International Application No. PCT/JP2012/006211, issued by the International Bureau of WIPO on Apr. 17, 2014.

(Continued)

*Primary Examiner* — William Spieler

(57) ABSTRACT

Provided is a method comprising: maintaining forward network structure information that, with stages arranged in a multilayer structure and each stage including one or more nodes associated with one or more words and associated in whole or in part with a point, connects nodes included in different layers with each other, in order from a higher layer toward a lower layer in a network state; acquiring one or more search word to use for a search; acquiring a node including all or part of the acquired search words and converting the acquired search words into a point; and using the forward network structure information to calculate points by sequentially adding together in a manner to inherit points, in node units of each layer, the points associated with the acquired node along all paths connected by these points from a topmost layer to the node of a predetermined layer.

17 Claims, 14 Drawing Sheets

(56) References Cited

FOREIGN PATENT DOCUMENTS

JP            2005-251029 A     9/2005
JP            2008-3931 A       1/2008

OTHER PUBLICATIONS

International Search Report for International Patent Application No. PCT/2012/006211, issued by the Japanese Patent Office on Dec. 11, 2012.
Office Action for Japanese Patent Application No. 2013-537403, issued by the Japanese Patent Office on Apr. 1, 2014.
Extended European Search Report for European Patent Application No. 12838372.6, issued by the European Patent Office on Jan. 12, 2016.

| ID of Node | Keyword | Link to NodeID#1 | Link to NodeID#2 | ... | Link from NodeID#1 | ... |
|---|---|---|---|---|---|---|
| A-1 | engine does not start | B-1 | B-2 | ... | NA | ... |
| B-1 | fuel warning lamp lighting | C-1 | NA | ... | A-1 | ... |
| B-2 | battery warning lamp lighting | C-3 | NA | ... | A-1 | ... |
| B-3 | starter is heavy | C-3 | NA | ... | A-1 | ... |
| B-4 | starter does not work | C-4 | C-5 | ... | A-1 | ... |
| . | , | . | , | . | , | . |
| . | , | . | , | . | , | . |
| . | , | . | , | . | , | . |

FIG. 3A (Node Table)

| A-1 | engine does not start |
|---|---|

| B-1 | fuel warning lamp lighting |
|---|---|

(Link Table)

| A-1 | B-1 |
|---|---|

| A-1 | B-2 |
|---|---|

| B-1 | C-1 |
|---|---|

FIG. 3B search result (C-3)                            (conformity rate)
    Charge quantity of the    ★★★★★
    battery is low (C-4)
    trouble of the battery        ★★

(C-4)
    trouble of the electric       ★★
    equipment

FIG. 6

SEARCH SYSTEM, DISPLAY UNIT, RECORDING MEDIUM, APPARATUS, AND PROCESSING METHOD OF THE SEARCH SYSTEM

CROSS-REFERENCE TO RELATED APPLICATIONS

The contents of the following Japanese and PCT patent applications are incorporated herein by reference:
No. 2011-223306 filed in JP on Oct. 7, 2011
No. PCT/JP201.21006211 filed on Sep. 27, 2012

BACKGROUND

1. Technical Field

This invention relates to the search technology of a search system using a database that has a forward network structure.

2. Related Art

Conventionally, for example, technology is known relating to a failure diagnosis apparatus for a vehicle, in which a cause and effect relationship is set as a node and a technique is implemented for performing a case search, for example, using a database having a forward network structure in which nodes are connected to each other in a tree structure, such as disclosed in Patent Document 1. With this technique, a so-called "inquiry type" search system is provided to determine the cause by tracing the connections between nodes in response to an input answer of a user to questions about the nodes, which are associated with the tree.

As another example, although it is not a database having a forward network structure such as described above, a retrieval system is provided that represents the elements to be searched by a plurality of vectors and performs a search according to the matching degree with respect to the vector of the search keywords, such as described in Patent Document 2.

Patent Document 1: Japanese Patent Laid-Open No. 62-004663 bulletin
Patent Document 2: Japanese Patent Laid-Open No. 2005-011042 bulletin However, the conventional technology mentioned above has the following problems. That is, with the technology of Patent Document 1, because it is necessary for a user to reply to questions one by one, this technology is not suitable for immediate decision making, since it takes effort and time to get the desired answers.

In addition, in a case where the user can assume several possible answers to the question content or a case where the user cannot decide on a unique answer, the user must try all of the answers, or at worst follow all of the diverging branches.

In addition, with the technique of Patent Document 2, search results can be obtained instantly by appointing a plurality of search keywords, but there is a problem because the linkage between the elements which are expressed in a vector is judged based only on the distance and the direction of each vector, and this is not suitable for the relation of elements such as answers and results, for example, for the linkage of elements such as "lighting of the HDD trouble lamp" and "trouble of the HDD".

SUMMARY

According to a first aspect of the present invention, provided is a search system comprising: a forward network structure information maintenance section that, with stages arranged in a multilayer structure and each stage including one or more nodes associated with one or more words and associated in whole or in part with a point, maintains forward network structure information that connects nodes included in different layers with each other, in order from a higher layer toward a lower layer in a network state; a search word acquisition section acquiring one or more search words to use for a search; a node acquisition section having means to acquire a node including all or part of the acquired search words and to convert the acquired search words into a point; a point calculation section that, using the forward network structure information, calculates points by sequentially adding together in a manner to inherit points, in node units of each layer, the points associated with the nodes acquired by the node acquisition section along all of the paths connected by these points from a topmost layer to the node of a predetermined layer; and a display control section that controls display of the result obtained by ordering all or part of the nodes in the predetermined layer, using the points that have been calculated for each node in the predetermined layer.

According to a second aspect of the present invention, provided is a display unit for displaying the results output by the search system described above.

According to a third aspect of the present invention, provided is a computer-readable recording medium on which is recorded data having a data structure that contains a hierarchy of a plurality of nodes and a plurality of layers, wherein each of the one or more layers has at least one or more nodes, the nodes are associated with one or more words and associated in whole or in part with a point, and (i) a connection is formed from each of the at least one or more nodes included in any one of the plurality of layers except the bottommost layer, toward at least one or more nodes included in one or more layers at a lower position than the one layer, and each of the one or more nodes in the one layer is connected to neither the nodes in the one layer nor nodes in the higher layers, or (ii) a connection is formed from each of the at least one or more nodes included in any one of the plurality of layers except the topmost layer, toward at least one or more nodes included in one or more layers at a higher position than the one layer; and each of the one or more nodes in the one layer is connected to neither the nodes in the one layer nor nodes in the lower layers.

According to a fourth aspect of the present invention, provided is an apparatus having a data structure that contains a hierarchy of a plurality of nodes and a plurality of layers, wherein each of the one or more layers has at least one or more nodes, the nodes are associated with one or more words and associated in whole or in part with a point, and (i) a connection is formed from each of the at least one or more nodes included in any one of the plurality of layers except the bottommost layer, toward at least one or more nodes included in one or more layers at a lower position than the one layer, and each of the one or more nodes in the one layer is connected to neither the nodes in the one layer nor nodes in the higher layers, or (ii) a connection is formed from each of the at least one or more nodes included in any one of the plurality of layers except the topmost layer, toward at least one or more nodes included in one or more layers at a higher position than the one layer, and each of the one or more nodes in the one layer is connected to neither the nodes in the one layer nor nodes in the lower layers.

According to a fifth aspect of the present invention, provided is a search system comprising: a means that displays a screen for acquiring one or more search words to use for a search; and a means that, upon receiving input of a search word from a user, acquires points from a forward network structure information maintenance section that, with stages arranged in a multilayer structure and each stage including one or more nodes associated with one or more words and associated in whole or in part with a point, maintains forward network structure information that connects nodes included in different layers with each other, in order from a higher layer toward a lower layer in a network state, where the points correspond to a node including all or part of the input search words that are acquired, calculates points by sequentially adding together in a manner to inherit points, in node units of each layer, the points associated with the nodes along all of the paths connected by these points from a topmost layer to the node of a predetermined layer, and displays a result of ordering all or part of the nodes of the predetermined layer using the acquired points.

According to a sixth aspect of the present invention, provided is a method comprising: maintaining forward network structure information that, with stages arranged in a multilayer structure and each stage including one or more nodes associated with one or more words and associated in whole or in part with a point, connects nodes included in different layers with each other, in order from a higher layer toward a lower layer in a network state; acquiring one or more search word to use for a search; acquiring a node including all or part of the acquired search words and converting the acquired search words into a point; using the forward network structure information to calculate points by sequentially adding together in a manner to inherit points, in node units of each layer, the points associated with the acquired node along all of the paths connected by these points from a topmost layer to the node of a predetermined layer; and displaying the result obtained by ordering all or part of the nodes in the predetermined layer, by using the points that have been calculated for each node in the predetermined layer.

According to a seventh aspect of the present invention, provided is a search system including a forward network structure information maintenance section that, with stages (layers) arranged in a multilayer structure and each stage including one or more nodes associated with one or more words and associated in whole or in part with a point, maintains forward network structure information that connects nodes included in different layers with each other, a search word acquisition section acquiring one or more search words to use for a search, a node acquisition section that acquires a node including all or part of the acquired search words, and a point calculation section that calculates in a manner to inherit points, in units of the bottommost layer nodes, points associated with the nodes acquired by the node acquisition section from among nodes in the paths tracing connected nodes in the forward network structure.

In addition to the configuration described above, the search system may include a result display section that displays the result obtained by ordering all or part of the nodes in the bottommost layer, using the points that have been calculated for each node in the bottommost layer. Furthermore, the result display section may have a higher layer display means to display as a list one or more words associated with nodes of the higher layers connected to each node of the bottommost layer.

In addition to the configuration described above, the point calculation section may have a downward calculating means that performs the calculating process by calculating the connected nodes from the topmost layer towards the bottommost layer.

In addition to the configuration described above, among the nodes forming the tree structure, nodes of higher layers may be connected with nodes of lower layers by the one or more words in a manner to have a cause and effect or effect and cause relationship.

In addition to the configuration described above, the forward network structure information maintenance section may include a point maintenance means, which maintains the points in association with the nodes, and a point modification means, which modifies the maintained points.

In addition to the configuration described above, the search system may have a point modification control section to edit a value of points associated with the node by use of all or part of the search words acquired by the search word acquisition section directly or indirectly.

In addition to the configuration described above, the search system may calculate the points in units of a predetermined middle layer, instead of units of the bottommost layer. Specifically, the search system include a forward network structure information maintenance section that, with stages arranged in a multilayer structure and each stage including one or more nodes associated with one or more words and associated in whole or in part with a point, maintains forward network structure information that connects nodes included in different layers with each other, a search word acquisition section acquiring one or more search words to use for a search, a node acquisition section that acquires a node including all or part of the acquired search words, and a point calculation section that calculates in a manner to inherit points, in units of the predetermined middle layer nodes, points associated with the nodes acquired by the node acquisition section from among nodes in the paths tracing connected nodes in the forward network structure.

In addition to the configuration described above, the search system may include a result display section that displays the result obtained by ordering all or part of the nodes in a layer lower than the predetermined middle layer using the points that have been calculated for each node in the predetermined middle layer.

According to an eighth aspect of the present invention, provided is a processing method of the search system that includes a forward network structure information maintenance step that, with stages arranged in a multilayer structure and each stage including one or more nodes associated with one or more words and associated in whole or in part with a point, maintains forward network structure information that connects nodes included in different layers with each other, a search word acquisition step acquiring one or more search words to use for a search, a node acquisition step that acquires a node including all or part of the acquired search words, a point calculation step that calculates in a manner to inherit points, in units of the bottommost layer nodes, points associated with the nodes acquired by the node acquisition step from among nodes in the paths tracing connected nodes in the forward network structure.

In addition, the summary of the invention is not intended to list all necessary features of the present invention, and the present invention may also be a sub-combination of the features described above.

BRIEF DESCRIPTION OF THE DRAWINGS

FIG. 3A A figure that shows an example of forward network structure information maintained by the search system of embodiment 1

FIG. 3B A figure that expresses other examples of forward network structure information maintained by the search system of embodiment 1

FIG. 6 A figure that shows an example of the display of the search results in the search system of embodiment 1

FORM TO CARRY OUT THE INVENTION

The following explains a form of the implementation of this invention using figures. In addition, the form of this implementation does not limit the invention, and the invention can be embodied in various ways without deviating from the intent of the invention.

Embodiment 1

Overview

Figure 1:
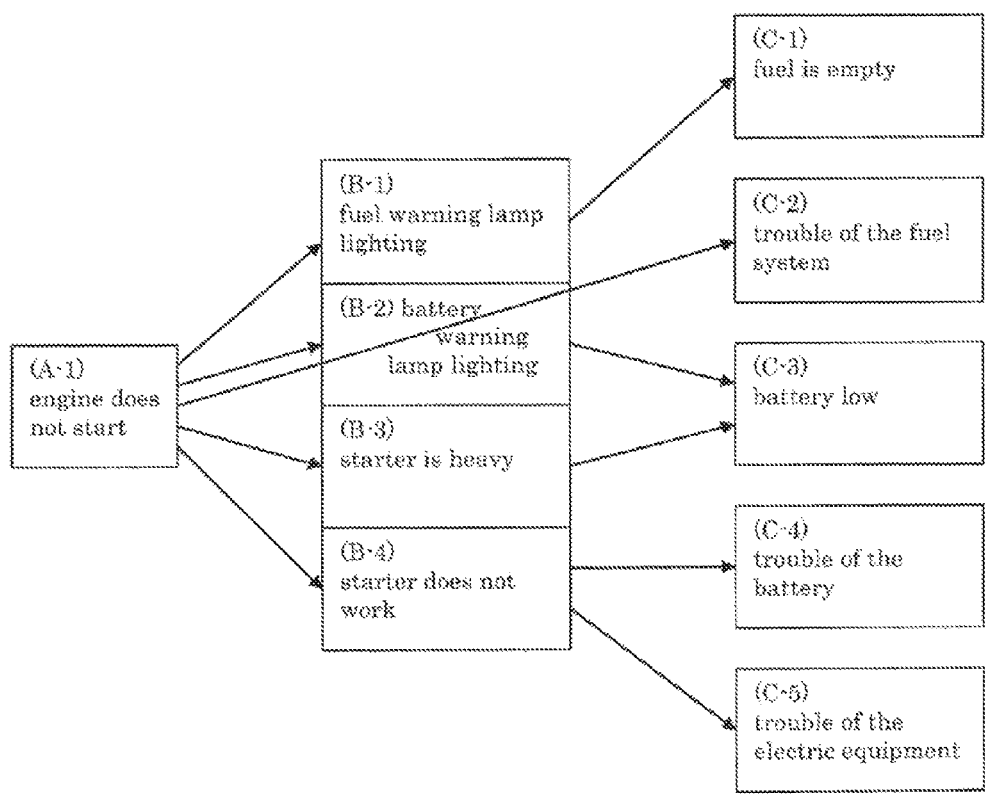
FIG. 1 A conception diagram to explain an example of the search in the search system of embodiment 1

FIG. 1 is a conception diagram to explain an example of the search in the search system of this embodiment. As shown in this figure, in this example, the nodes of the higher layer are associated with "effects" and the nodes of the bottommost layer are associated with "causes," to search for a cause of trouble in a vehicle. A case database is maintained according to the connection of each node according to the "cause" and "effect" relationship.

The user enters "engine" as a search word to this database to identify a cause of the engine of a motorcycle not starting, enters "battery warning lamp" because the battery warning lamp of the Control Panel has turned on, and enters "starter" and "worse" because the engine does not work easily even though the starter turns, and then clicks on the search button.

Then the search system searches each node (effect) of the higher layer in the example database with these search words as keywords. As a result, the nodes "(A-1) engine does not start", "(B-2) battery warning lamp lighting", "(B-3) starter is heavy", and "(B-4) starter does not work" including one or more of the search words are specified. And, for example, points are associated with each node according to the number of search words included in each node, such that there is 1 point for node "A-1", 1 point for node "B-2", 2 points for node "B-3", and 1 point for node "B-4".

The points of each node are calculated according to the associations (link relations) and the calculation result is given to the node of the bottommost layer of the link. As a result, among the nodes (cause) of the bottommost layer, calculation results of 2 points for node "(C-5) trouble of the electric equipment", 2 points for node "(C-4) trouble of the battery", 1 point for node "(C-2) trouble of the fuel system", 5 points for node "(C-3) battery low", and 1 point for node "(C-1) fuel is empty" are given, Therefore, for example, this search system shows a search result of "Is the amount of charge of the battery too low?" to the user, which is the search result having the highest point value, notifies the user of a solution such as "Please charge the battery" that is retained in the database in response to the cause node, or displays the search results including each cause node sorted sequentially according to points as other possible choices so that the user can understand the points.

In addition, the search system of this embodiment traces the path of a link from a node of the bottommost layer to a node of the topmost layer, and may display this path in order of nodes having higher points. The user can review and revise the search conditions and missing links by a comparison among the potential options by displaying the search path leading to the search results. In this case, the search system may display the paths from the node of the bottommost layer to the node of the topmost layer in a list form, or display the paths from the node of the bottommost layer to the node of the topmost layer graphically as part of the forward network structure (refer to FIG. 1). For example, by selecting a node in the bottommost layer that is displayed in the search result list above, the search system may display the paths from the node in the bottommost layer to the nodes in the topmost layer with different colors. In this way, the user can know the connections of the nodes including the search word at a glance.

In this way, by entering a search word, for example, the search system of the present embodiment can search for nodes configured hierarchically in a cause-effect relationship, and immediately display the result that the user wants to know, such as the cause of the effect represented by the nodes of the bottommost layer.

<Functional Constitution>

Figure 2:
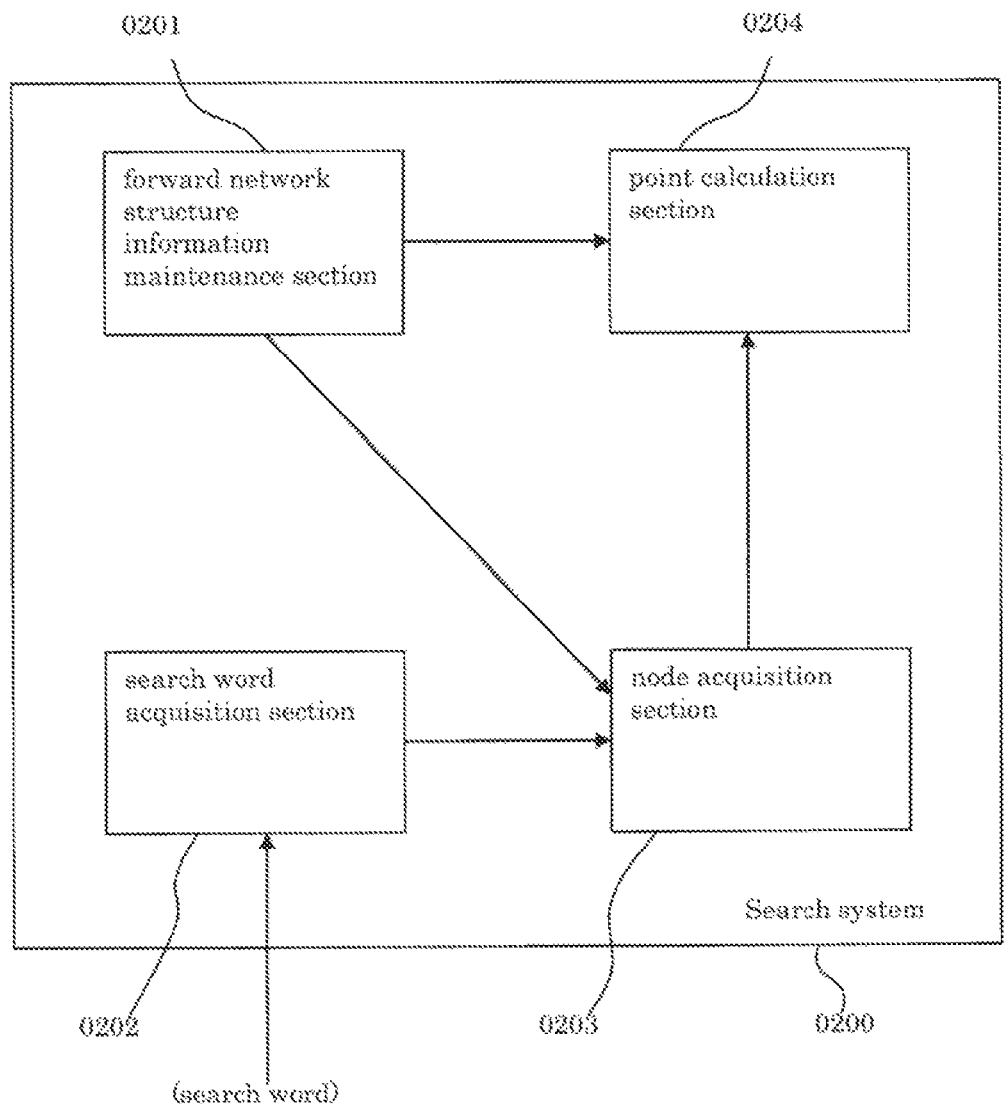
FIG. 2 A figure that shows an example of the function blocks in the search system of embodiment 1

FIG. 2 is a figure showing an example of the function blocks in the search system of this embodiment. In addition, the function blocks of this system described below can be realized as a combination of hardware and software. Specifically; if a computer is used, the search system may include a CPU and a main memory; a bus; or an auxiliary memory (reading drives of the memory media such as a hard disk, nonvolatile memory, CD, or DVD); a user interface to control an input device; a printing device and a display unit; hardware constitution sections such as other outside peripheral devices; an interface for the external peripheral devices; an interface for communication; other application programs and driver programs to control the hardware, and the like. The arithmetic processing by the CPU according to the program developed on the main memory causes data input from an input device or another user interface and stored in hard disk or memory to be edited, or generates the instructions for controlling the software and each of the pieces of hardware. As another example, the function blocks of this system may be realized by exclusive hardware.

In addition, this invention can be realized not only as a system, but also as a method. In addition, a part of this invention can be configured as software. Furthermore, software products used for causing a computer to execute such software and recording media including these software products are also included in the technical scope of the present invention naturally (the same is true through the whole of this Specification).

As shown in FIG. 2, a search system 0200 of this embodiment includes a forward network structure information maintenance section 0201, a search word acquisition section 0202, a node acquisition section 0203, and a point calculation section 0204.

The forward network structure information maintenance section 0201 has a function to maintain forward network structure information. The forward network structure information maintenance section 0201 can be implemented by an HDD and flash memory, or other various recording mediums, for example. This "forward network structure information" is information that, with stages arranged in a multilayer structure and each stage including one or more nodes, connects nodes included in different layers with each other. For example, the forward network structure information may be information that indicates a hierarchical structure such as shown in FIG. 1.

This forward network structure may be a general "binary tree structure", or may be a data structure in which a child node (nodes that are in a lower layer) is connected with one or more parent nodes (nodes that are in a higher layer than the child node), such as shown in FIG. 1, and a connection is formed from a node of the first stage directly to a node of the third stage, while skipping over the second stage. As another example, the forward network structure may be such that a node of a higher layer skips over one or more layers to be connected with a node of a lower layer.

The forward network structure information in this embodiment does not have connections (links) between nodes included in the same layer (stage), and has connections only between nodes of different layers. Each connection between nodes is formed only toward a node included in a lower layer from a node included in a higher layer. That is, a one-way connection is formed from node A of the n-th layer to node B of the (n+m)-th layer (m is a natural number of 1 or more), and no one-way connections are formed from a node of a lower layer to a node of a higher layer. With the data structure described here, links between nodes that would form a closed loop are prevented.

The actual data stored in various recording media may be, as shown in FIG. 3A for example, each node-ID, contents of each node (one or more words associated with the node), and index data associating the information indicating the ID of the parent node of the link origin and/or ID of the child nodes of the link destination of the node itself. In this way, the data can be configured as a hierarchical structure that the computer is able to process, such as shown in FIG. 1. In this example, ID associated with the node represents the layer type and the order or location of the nodes in the layer. Additional information associated with the contents of the node may also be included in each node. For example, each node can further comprise information of a link indicating external documents associated with the contents of the node. In this way, it is possible to display more detailed information about the contents of the node.

The forward network structure information may also be maintained as a relational data table in which the primary key is node ID, such as shown in FIG. 3B. In this case, the information indicating the connection (link) between nodes and the contents of the nodes may be stored in a different data table. In the example shown in FIG. 3B, the contents of the nodes are stored in correspondence with the node ID in a node table, and the connections between nodes are stored in link table.

This index data may show the stage where each node is located. For example, in FIG. 1, node "A-1" is in the 1st stage, and nodes "B-1" to "13-4" are in the 2nd stage. Using the information indicating the stage, it is possible to check whether the direction of the connection of the node indicated by the forward network structure information is an opposite direction, i.e. a direction toward a parent node from a child node. In this way, it is possible to exclude the opposite-direction connections, which are the cause of closed loops when tracing the connections of the nodes at the time of a search.

In this forward network structure information, each "node" mentioned above is associated with one or more words, and all or part of the nodes are associated with points. That is, the one or more words indicate the contents of the node. For example, words such as "fuel warning lamp lighting", "engine does not start", and similar word combinations correspond to the words in the example of FIG. 1.

The search system in this embodiment does not limit the one or more words in particular, but it is desirable for the words to be combinations equivalent to a sentence or to have a meaning equivalent to that of a sentence. This is because the words that are the contents of a target node matching the search words have a certain length and number, and having a more semantic association can be expected to improve the accuracy of search results. In addition, if a computer has enough processing capacity, it is possible to maintain a long sentence or even a document at a node.

As exemplified above, the contents and connections of each node are such that nodes of higher layers are associated with nodes of lower layers by the one or more words in a manner to have a cause and effect or effect and cause relationship, and each of the associated nodes are connected. However, the contents and connections of each node are not limited to such a constitution, and can be set appropriately depending on the purpose or the search object of each search system. For example, relationships such as "an effect" and "a cause", "an effect" and "an effect to be caused next", or "a large classification" and "a small classification" can be used. As another example, in the case of a recommended musical piece search for a user in response to a search word, the association and contents such as "genre—melody—creation date—title" are assumed. In addition, the contents of each node and the association can be created based on knowledge listed in a technical book, a manual, or can be created based on knowledge acquired from experts of each field. The method to store the contents of each node and the association as a database is described further below.

Concerning the points associated with a node, which is used for a calculation by a point calculation section described further below, points may be given in each search process according to the result, and may be given beforehand. The details of the process of setting the points for the nodes is described further below when describing the point calculation section.

The search word acquisition section 0202 has a function to acquire one or more search words to use for a search, and can be realized by an input device for search word input or a search word acquisition program including a GUI (Graphical User Interface), for example.

Figure 4:
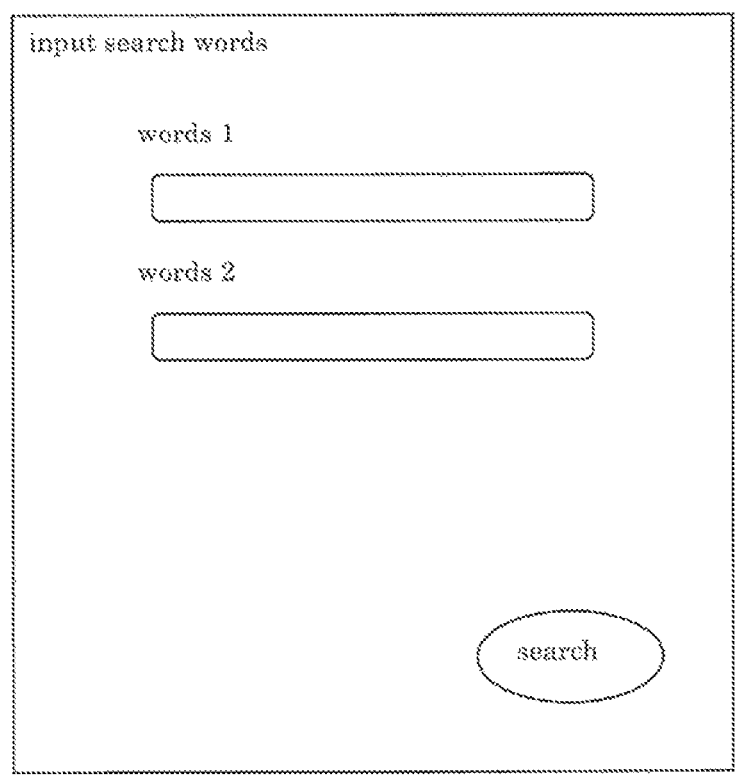
FIG. 4 A figure that expresses an example of the GUI screen for the search word acquisition in the search system of embodiment 1

Specifically, on the display of the search system, the GUI image shown in FIG. 4 is displayed, and the user operates an input device, for example, a keyboard, and enters one or more search words into the search word input column in the GUI screen. Then, by clicking the search button in the GUI screen, the text data input into the input column is acquired as a search word, and is stored by the "main memory" of the computer. As another example, the search word acquisition section may be realized by a microphone and voice recognition software.

There need only be at least one acquired search word, but acquiring two or more search words is desirable to improve the accuracy of the evaluation of search results according to the point calculation.

In addition, the search word acquisition section 0202 is not limited to the acquisition by the user input as described above, and may also automatically acquire, as the search words, words obtained through parsing by applying a computational process to natural sentences that were manually or automatically input, or may acquire a search word via communication with the Internet or the like. In this case, the search word acquisition section 0202 may include morphological analyzers or be connected to a network.

As another example, the search word acquisition section 0202 may receive the output from the monitors of various systems to acquire a search word. For example, words such as "temperature of the engine is beyond normal level" or "consumption of the fuel exceeded the threshold" output from the monitor of a control system of a plane may be acquired as search words. In this case, the output search word may be a specific code set beforehand corresponding to contents such as the above.

The node acquisition section 0203 can be realized, for example, by a CPU and a main memory, and includes a node acquisition program having a function to acquire a node including all or part of the acquired search words. In addition, the process of acquiring a node including the search word should include setting the search word as a search key and performing the search process for one or more words associated with each node.

The phrase "acquire a node including all or part of the search words" may include acquiring a portion of a plurality search words, e.g., node A need only include the word "engine" among the search words of "engine" and "worse", or may include a part of one search phrase, e.g., node A need only include "engine" that is a part of the search words "engine is worse".

This node acquisition section 0203 sets the forward network structure information in FIG. 1 as the search target, and acquires nodes "A-1", "B-2", "B-3", and "B-4" as the results by performing a search process with the search words "engine", "battery warning lamp", "starter", and "worse".

The point calculation section 0204 has a function to calculate the points associated with a node acquired by the node acquisition section 0203, in units of nodes of the bottommost layer, among nodes in the paths tracing connected nodes in the forward network structure. The point calculation section 0204 can be realized by a CPU, main memory, and point calculation program, for example.

Specifically, for example, nodes "A-1", "B-2", "B-3", and "B-4" are acquired by the search process of the node acquisition department 0203 for the forward network structure information shown in FIG. 1, and each node is given points depending on the number of search words included therein. Here, the point relationship is such that node "A-1" has it point because one search word (engine) is included therein, node "B-2" also has 1 point for the same reason, node "B-3" has 2 points because two search words (starter and worse) are included, and node "B-4" has 1 point.

Figure 5A:
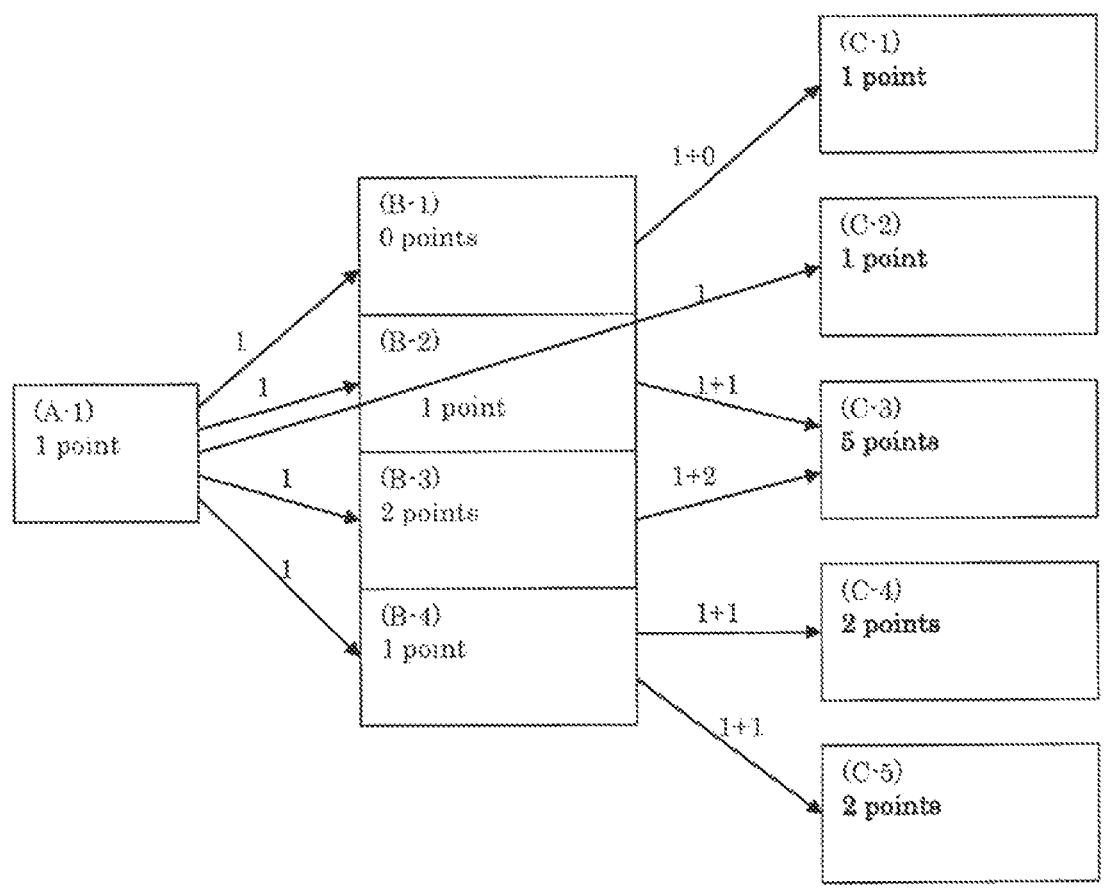
FIG. 5A A figure to explain the point calculation of the bottommost layer nodes in the search system of embodiment 1

The arithmetic unit of the search system references the index data shown in FIG. 3A or FIG. 3B and traces the link sequentially, with the node "A-1" shown in FIG. 5A as a start point, for example, and the result of adding "A-1" (1 point) and "B-1" (0 points) was given to a node "C-1" (there is no gasoline) of the bottommost layer. Similarly, the result of adding together the sum of "A-1" "B-2" and the sum of "A-1" "B-3" was given to "C-3" (5 points), and the result of adding "A-1" and "B-4" was given to "C-4" and "C-5" (2 points). In the path to "C-3", two paths (A-1→B-2→C-3) and (A-1→B-3→C-3) exist, but according to this example, it is possible to identify the path (A-1→B-3→C-3) as the path closest to a correct answer, since this path includes "B-3", which has more search words.

In this way, the point calculation section 0204 assumes node "A-1" as a start point in the manner described above and may have a downward direction calculation means to trace the nodes towards the bottommost layer from the topmost layer, and to perform calculation processing. As another example, the point calculation section 0204 may assume a lower layer node as a start point and have an upward direction calculation means to trace the nodes towards the topmost layer from the bottommost layer.

Figure 5B:
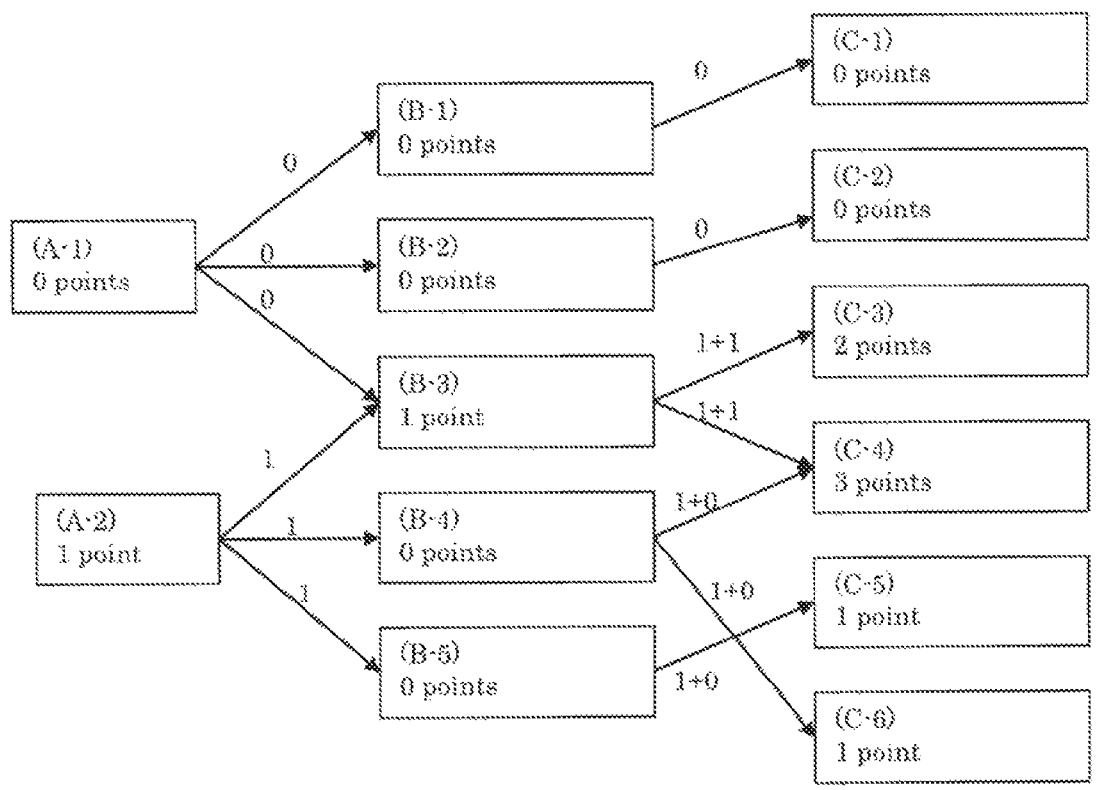
FIG. 5B Another figure to explain the point calculation of the bottom layer nodes in the search system of embodiment 1

FIG. 5B is a figure to explain point calculation in detail. The node acquisition section 0203 acquires a node including all or part of the acquired search words, with reference to forward network structure information maintenance section 0201. FIG. 5 shows an example in which the search words included in nodes "A-2" and node "B-3" were acquired, and the node acquisition section 0203 acquires nodes "A-2" and "13-3" including the search word. Next, the point calculation section 0204 chooses the node of a bottommost layer that is connected with the most nodes in the paths that trace the connected nodes acquired by node acquisition section 203, with reference to the forward network structure information maintenance section 0201, from the topmost layer in the forward network structure to the bottommost layer, and is connected. In this example, the point calculation section 0204 identifies seven paths that include node "A-2" and node "B-3" to be (path 1: A-1→B-3→C-3); (path 2: A-1→B-3→C-4); (path 3: A-2→B-3→C-3); (path 4: A-2 B-3→C-4); (path 5: A-2→B-4→C-4); (path 6: A-2→B-4→C-6); (path 7: A-2→B-5→C-5), and calculates the points at each node of the bottommost layer. Because the largest number of nodes (node A-1; A-2; B-3; B-4) is connected with node "C-4" in the bottommost layer among these seven paths, the point calculation section 0204 chooses node "C-4". In other words, three paths including paths 2, 4, and 5 exist as paths to C-4, but according to this example, the point calculation section 204 identifies path 4, which is the path including the nodes (A-2 and node B-3) having more search words, as the path that is closest to a correct answer. By using such an algorithm, it is not necessary to calculate the points of all paths and the computational complexity can be reduced.

In this example, the points associated with a node are decided according to the number of search words, but various applications are possible. For example, points may be added depending on the importance that the user thinks a search word has. As another example, points that are weighted with values such as 1-5 may be added depending on the importance that the user thinks a search word has. The search word that a user thinks to be more important is given a high point value, and therefore the search results after the calculation reflect the opinion of the user.

The points associated with a node may be a value that was calculated from the number of search words, and need not be the number itself. For example, values that are revised according to the weighted value for every search word based on the number of search words may be used. In this case, a table that associates a weighted value with a search word beforehand and is held and referred to. In addition, a different table may be used for the weighted value depending on the search purposes, for example. The table may be such that, concerning search words such as "engine" and "heavy" in a search for a cause of trouble, "engine" is given a small weighted value because it is a word often acquired by all searches for trouble, while "heavy" is given a large weighted value because it shows a specific phenomenon of trouble. As another example, a table may be such that, in a car model search to decide on a vehicle to purchase, "engine" is given a large weighted value because it is an important part of the vehicle, while "heavy" is given a small weighted value because the importance for determining a purchase is low. The table to be used may be determined with reference to search purpose information that is acquired through user input at the time of the search.

In addition, the points associated with a node may be established based on attribute information that was prepared beforehand relating to the search word. Attribute information may be information unique to a search purpose or to a search target. For example, because the search system of this example is a system to search for a cause of trouble, the system may have attribute information such as "trouble", "deterioration", "life", "price", and "importance" for every search word beforehand, and each type of attribute information is given a weighted value beforehand. The points are calculated based on each weighted value corresponding to the attribute information that the search word "engine" has. These values may use a normalized value (0-1). For example, the value may be calculated as F (node)=Σn (trouble rate+deterioration time coefficient+life coefficient+price+importance). Here, "n" shows the number of search words included in the node. Specifically, when calculating "the risk that engine trouble gives in the whole system" (the risk that engine trouble gives in the whole system)=1.2 (engine trouble rate)+1.1 (deterioration time for engine coefficient)+1.3 (life coefficient of the engine)+20 (price of engine coefficient)+3.0 (importance of the engine)=8.6.

In addition, more than one sentence may be included as the contents of a node. In such a case, for a sentence associated with one node, a plurality of search words may be a match. In this case, the point calculation section 0204 may give a larger weight value to nodes that include more search words.

The points are not limited to being dependent on the number of the search words included in the node. For example, preliminarily points may be associated with nodes uniformly or depending on the content, and the points may be calculated, as described in Embodiment 2 further below.

Based on the points calculated in this way, the search system of this embodiment shows that the content "Charge quantity of the battery may be low" of the node having the highest point value in the bottommost layer is the search (the reasoning) result of highest accuracy. For example, as shown in FIG. 6, a conformity rate is calculated to express accuracy of the reasoning from the points calculated for every node of the bottommost layer, and the results obtained by ordering all or part of the nodes of the bottommost layer sequentially from the highest conformity rate that was calculated (result display section).

In addition, this result display section may have a higher layer display means to display a list of the contents or one or more words associated with the nodes of the higher layers that are connected with each of the nodes of the bottommost layer, for each node in the bottommost layer. The effects of such a display are that, for example, the user can reference the lists to confirm the contents of the higher layer nodes connecting to the bottommost layer node that was a correct answer, and if there is a node that contains contents other than the search words that was entered, can expect to find search words included in the content that have been overlooked as keywords.

As another example, a mother may search for a disease contracted by her child using the search words "fever" and "vomiting", and when "mumps" and "campylobacter enteritis" are displayed as the results with equal points, the contents of nodes of the higher layers that are associated with each result are displayed as a list. Then in addition to the nodes "fever" and "vomiting", the nodes having contents such as "chills" and "headache" are associated with the "mumps". On the other hand, in addition to the nodes "fever" and "vomiting", the nodes having contents such as "diarrhea" and "hematochezia" are associated with "campylobacter enteritis".

Therefore the mother watches for changes in the symptom of the child, and it is possible to confirm whether these signs are present and judge which disease it is, or to care for these symptoms and nurse the child.

In addition, if the search is performed using a search word output by the monitor of the control system of the above-mentioned plane, a pilot can be notified of search results such as "abnormality of the jet control valve of the engine", which has the highest calculated point value, via audio output, and a flashing control signal of a warning lamp that was established on the operation panel of the plane to notify the pilot about "abnormality of the jet control valve of the engine" may be output.

According to the configuration described above, when a search word is entered, for example, the node group that was constructed to be associated with a condition such as "cause and effect" in the hierarchical forward network structure is searched, the path of the linkage is traced, and the points of each node can be calculated in units of nodes of the bottommost layer. Therefore, the user can know the causes of the effects shown in the node of the bottommost layer having the highest point value immediately; without taking the trouble such as seen in the inquiry type of search described above.

As another example, the nodes of the bottommost layer can be ordered according to their points, and a user can be presented with the causes shown by the plurality of ordered nodes of the bottommost layer. When there are a plurality of search results, it is possible to present a user with ordering that indicates the possibility of an answer in the search being correct.

It is also possible to display the contents (one or more associated words) of the nodes of the higher layers as a list, for every node of the bottommost layer. The user can refer to the list, for example, and confirm the contents of the higher layer nodes connected to the bottommost layer node that was a correct answer, and therefore the effect finding search words that were overlooked can be expected.

Modification 1

In a case of HTML documents connected with links on the Internet, it is possible to assume a forward network structure in which a given HTML document is a node of the topmost layer, and the HTML documents that are linked directly thereto are nodes of the second layer. For example, a keyword or description of the HTML document is acquired as character strings to create the content corresponding to the node. In addition, a link URL described in a document is registered with the forward network structure information maintenance section 0201 as link information indicating the association with other nodes. The registration in the forward network structure information maintenance section may be performed by manual operation, or by using an editing means explained in conjunction with FIG. 11A and FIG. 119.

As another example, when recommended books are associated with Internet search results, it may be assumed that the recommended books are nodes of the bottommost layer, and the recommended books may be presented in order according to the points calculated by this search system. Furthermore, "the number of the keyword access" may be used as attribute information when using an HTML document on the Internet as a node, such as in this example.

Modification 2

As a modification of the present embodiment, the points mentioned above may be calculated in units of the nodes in a predetermined middle layer, instead of in units of the nodes in the bottommost layer. In this case, the point calculation section 0204 may calculate the points associated with a node acquired by the node acquisition section 0203, among the nodes in the paths that trace the connected nodes, in units of nodes in the predetermined middle layer in the forward network structure. The "predetermined middle layer" may be a reception layer (e.g., a layer including the node designated by input to directly appoint a layer number or by user input concerning the contents of the node) by user input through GUI screens, or may be a layer set beforehand.

As another example, when a node including all or part of the search words is acquired by node acquisition section 0203, the point calculation section 0204 may perform the calculation in units of nodes in the lowest layer where a node that includes all or part of the search words was found, or may perform the calculation in units of nodes that are in a layer at least one level lower than the layer mentioned above. In other words, when an input search word is acquired and the lowest layer node is in the m-th layer, the predetermined middle layer may be this m-th layer, the (m+1)-th layer, the (m+2)-th layer, or any layer lower than this.

When the object of the search has a very complicated structure such as the hierarchy structure used to identify trouble in the large-scale plant, the degree of association between the contents of a node of the m-th layer and a node of the bottommost layer may be low. However, according to the constitution mentioned above, the user can find a requested result easily by pinpointing the layer in which calculation is to be performed, even if the object of the search system is very complicated.

The "result display section" may display the ordered results for all or part of the nodes connected with the layers lower than the predetermined middle layer, using the points calculated tier every node of the predetermined middle layer.

Specifically, for example, in the forward network structure information used for a disaster simulation search system, nodes are connected depending on a change over time of contents, such that the node of the 1st layer "wind velocity>60 m/s" is connected to the 2nd layer nodes "service stop of the main route" and "20% of fallen trees". Among nodes that include search words such as "wind velocity of 65 m/s" and "Yamanote train line has halted operation," the points are calculated with the lowest layer including one of these nodes set as the predetermined intermediate layer. Continuing with this example, the 3rd layer nodes "lack of supplies" and "outbreak of return refugees" that are connected, based on the change over time, with a node in a layer below the node "operation halted on the main route" having 5 points are displayed as search results having 5 points. In addition, the 3rd layer node "outbreak of an injured person on the way home" that is connected, based on a change over time, with layers lower than the node "20% of fallen trees" having 2 points, are displayed as search results having 2 points.

In this way, for example, nodes in the forward network structure information are connected according to a change over time of the contents of the nodes, and by calculating the points in units of nodes in the predetermined middle layer in the forward network structure, it is possible to predict the possibility of future effects occurring.

<Hardware Configuration>

Figure 7:
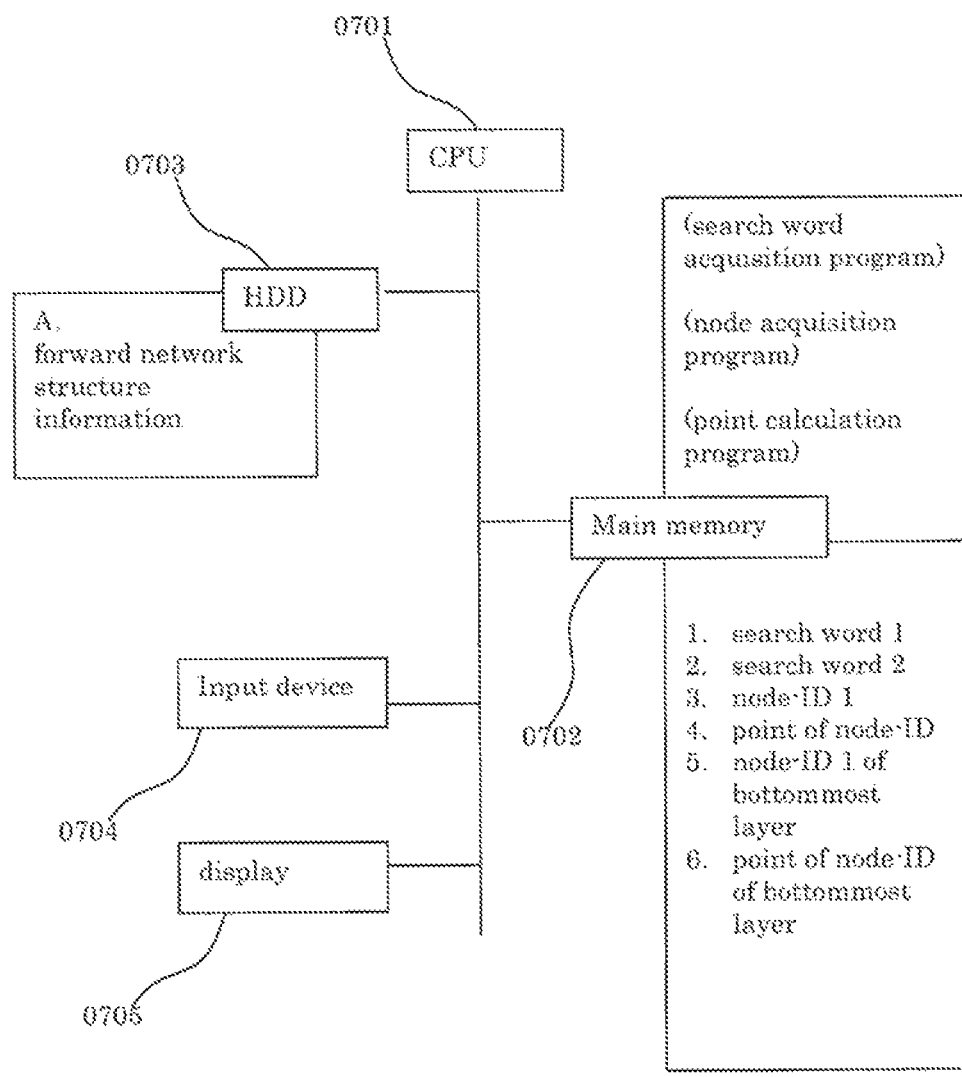
FIG. 7 A figure that shows an example of the hardware constitution in the search system of embodiment 1

FIG. 7 is a schematic view that shows an example of the constitution of the search system when each functional element mentioned above is realized as hardware. Using this figure, an explanation of the function of each hardware element in the search process using point calculation of the nodes is provided.

As shown in FIG. 7, the search system of the present embodiment comprises a CPU 0701 and a main memory 0702, which carry out operations and processing to realize the functions of a node acquisition section, a point calculation section, and various other functions. In addition, the search system comprises a forward network structure information maintenance section HDD 0703, a search word acquisition section 0202 that is the keyboard, an input device 0704 that includes various other user input devices, and a display section 0705 that displays search results. These components are connected to each other by data communication paths such as "system buses," and perform transmission, reception, and processing of information.

A program is read in the main memory 0702, and the CPU0 701 references the read program and executes various operational processes according to a programmed procedure. In addition, a plurality of addresses are assigned to storage devices such as this main memory 0702 or the HDD 0703, and in the operation processing of CPU 0701, the operational processing using data can be performed by identifying the address and accessing the stored data.

Here, for example, the forward network structure information is generated by automatically analyzing the input by the operator or the acquired sentence using morphological analysis technology, and recorded in the HDD 0703. Specifically, when an operator inputs one or more words connected with each node or inputs information to designate a link structure indicating the connections between nodes, the index data shown in FIG. 3A or FIG. 3B is generated by an operation of the CPU 0701 and recorded in the HDD 0703. As another example, when the search system acquires a phrase such as "when the engine does not start, causes such as (1) lack of gasoline, (2) lack of battery charge, (3) damage to the starter, etc. can be imagined. In the case of (1), the fuel warning lamp . . . ", a morphological analysis is performed on this phrase and a process is performed to generate and determine the connection of nodes according to the meaning of this phrase, thereby generating index data that is then stored in the HDD 0703.

After this, when a user starts the search system, the CPU 0701 interprets a search word acquisition program and displays in the display 0705, for example, the GUI screen shown in FIG. 4. The CPU stores the words that the user input into the input column in the screen, e.g., "engine", "battery warning lamp", "starter", or "heavy" at a predetermined address in the main memory 702, as search words.

Then, the CPU 0701 interprets a node acquisition program, and according to the interpretation result, acquires each search word that was stored in the main memory 0702 as a search key and, with the forward network structure information maintained by the HDD 0703 as a search target, executes processing similar to the conventional search processing. The CPU 0701 identifies the ID of the node including the search word in conjunction with the number information (points) of the search words included in the contents and stores each ID in a predetermined address of the main memory 0702.

Next, the CPU 0701 interprets a point calculation program, and according to the interpretation result, references the forward network structure information and acquires the path (link relations) indicated by the connections of nodes stored in the main memory 0702. Among the nodes in the acquired path, the points associated with nodes stored in the main memory 0702 are calculated by operational processing of the CPU 0701 in units of the nodes of the bottommost layer. The calculated results are each stored in a predetermined address of main memory 0702, in association with the IDs of the nodes of the bottommost layer.

Finally, the CPU 0701 interprets a search result display program, and according to the interpretation result, for example, displays the contents of the nodes with the highest point values in the display 0705, or displays the ordered results for some or all of the nodes in the bottommost layer as a list in the display 0705, according to the points.

In addition, the search system can be realized through the Internet, such as shown by the other constitution example 1. Specifically, for example, the input device 704 and display 0705 are provided in a terminal of the user, other components are installed in the server, and these components are connected to each other through the Internet. In this case, the components (CPU 0701, main memory 0702, HDD 0703) may be arranged in one server on the network, or may be dispersed and located in a plurality of servers.

<Process Flow>

Figure 8:
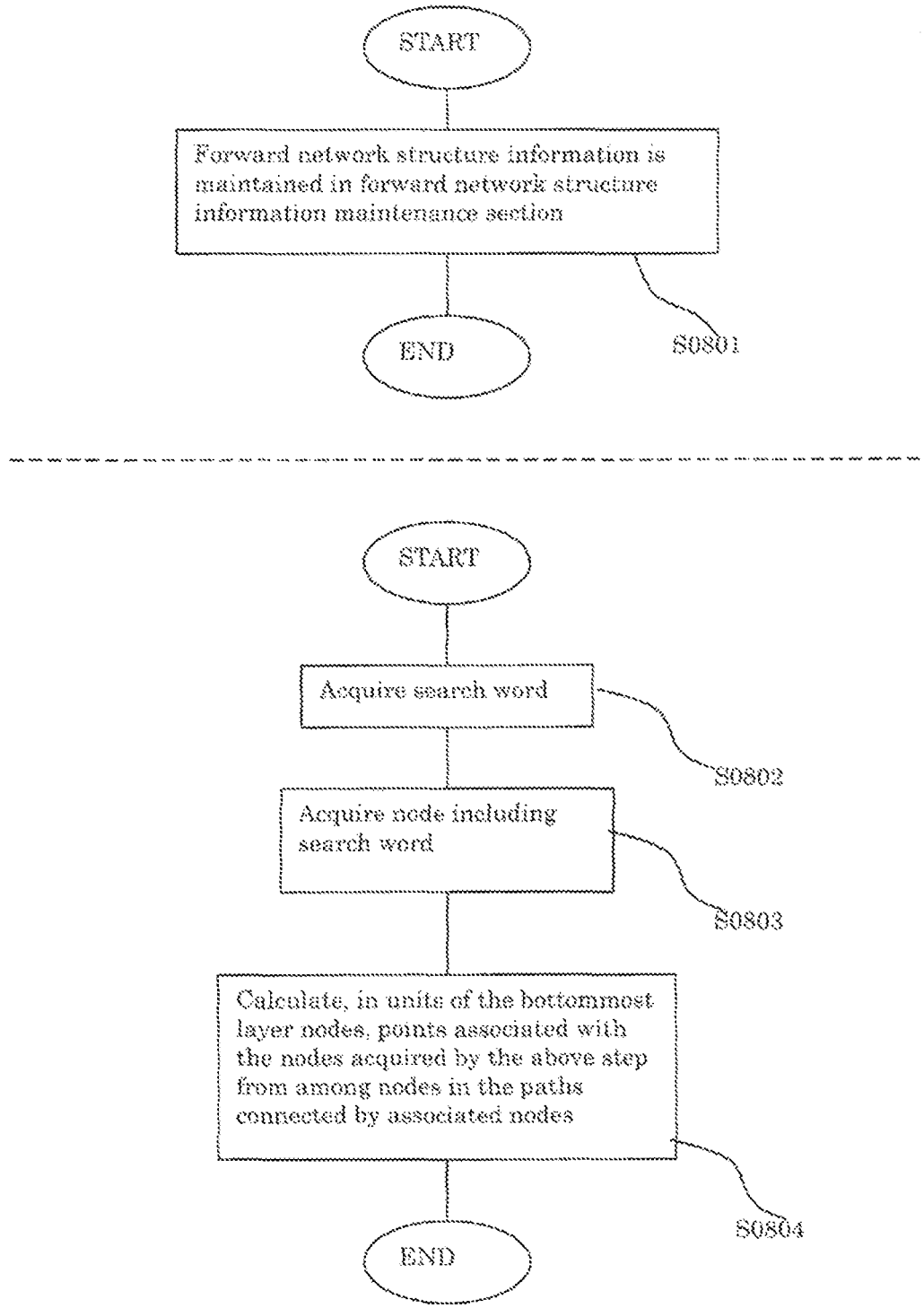
FIG. 8 A flow chart that shows an example of the flow of the processing in the search system embodiment 1

FIG. 8 is a flow chart showing an example of the flow of the processing performed by the search system of this embodiment. The steps shown below may be executed by each piece of hardware constituting the computer, such as described above, or a program may be recorded on a medium and used to cause each step to be executed, by controlling a computer.

As shown in FIG. 8, first, associations are formed with one or more words, and with a multilayer structure of stages which include one or more nodes that are associated all or in part with points, the forward network structure information is recorded in the forward network structure information maintenance section to maintain the forward network structure information in which the nodes included in different stages are connected to each other (step S0801).

In the search system maintaining this forward network structure information, for example, one or more search words, which are the words used for a search, are acquired via user input, input resulting from automatic analysis of a sentence, or input through the communication circuit (step S0802), and through the search operation process of arithmetic units, nodes including all or part of the acquired search words are acquired (step S0803).

Next, among the nodes in the paths tracing connected nodes in the forward network structure, points associated with nodes acquired in the node acquisition step are calculated in units of nodes of the bottommost layer (step S0804), and the contents relating to the nodes of the bottommost layer having the highest point values according to the acquired points are displayed, or the nodes of the bottommost layer are displayed in a list, with an order according to the points.

With this constitution, by entering search words, for example, a search is performed for nodes arranged to have a "cause and effect" relationship in a hierarchy, and the user can immediately know the causes of the effects shown in the nodes of the bottommost layer.

In addition, since the nodes of the bottommost layer can be ordered according to the points, the ordered search results can be presented to the user.

Embodiment 2

Overview

The present embodiment is based on the embodiment mentioned above, and the search system is characterized by the feature that the points associated with the nodes are not associated according to the number of search words included in the nodes after the search using the search words, and are instead associated in a database beforehand, and that the associations can be modified appropriately according to the feedback of search results.

<Functional Constitution>

Figure 9:
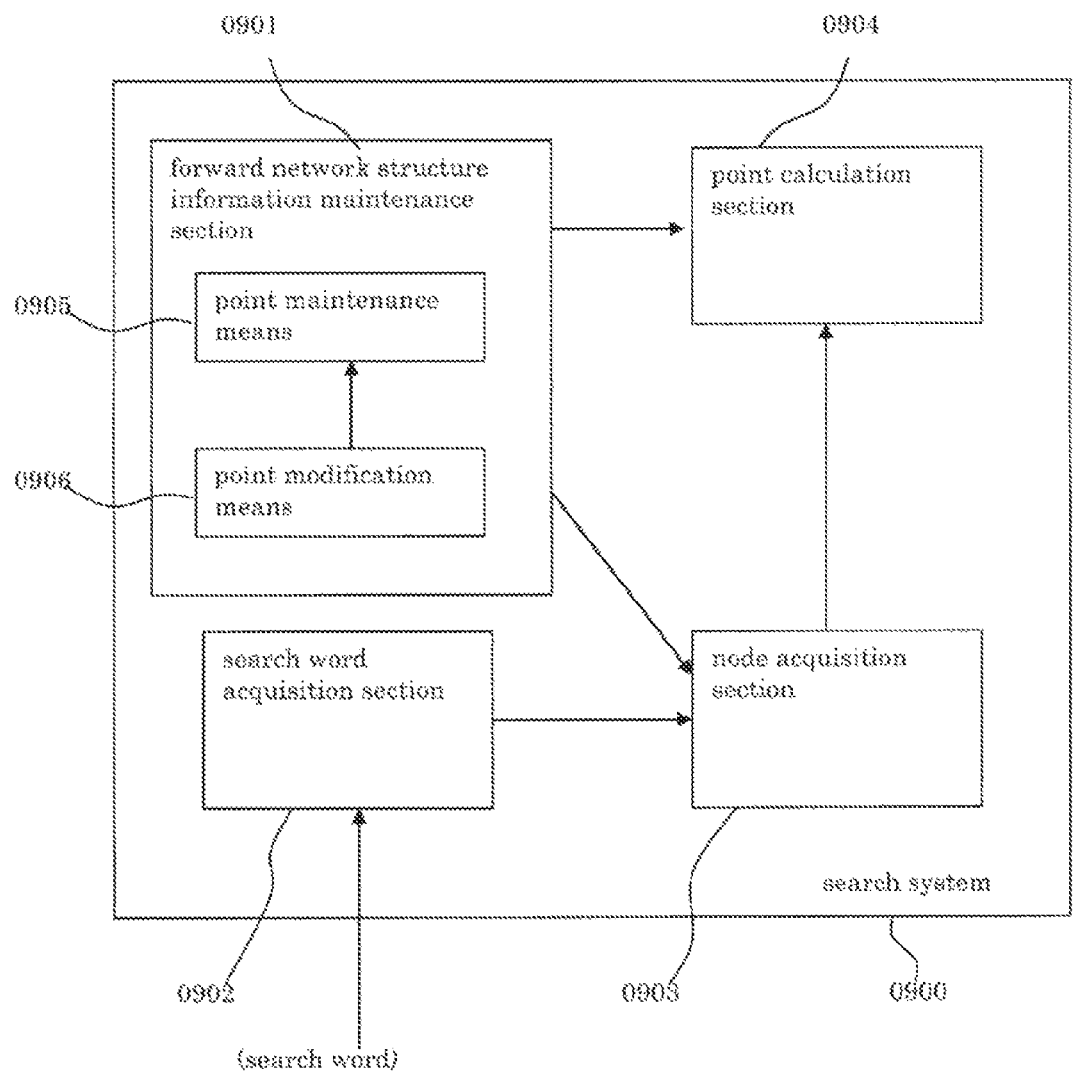
FIG. 9 A figure that shows an example of the function blocks in the search system of embodiment 2

FIG. 9 is a figure showing an example of the function blocks in the search system 0900 of this embodiment. As shown in this figure, the search system 0900 of this embodiment has, on the basis of embodiment 1, a forward network structure information maintenance section 0901, a search word acquisition section 0902, a node acquisition section 0903, and a point calculation section 0904. In addition, the search system 0900 may have a "calculation means for lower parts" or a "result indication section", which are not shown.

The forward network structure information maintenance section 0901 further includes a point maintenance means 0905 and point modification means 0906 in the search system of this embodiment.

The point maintenance means 0905 has a function to maintain the points associated with the nodes together. Specifically, for example, among the items of the index data of FIG. 3A or FIG. 3B, an item storing the points established beforehand is prepared, the nodes may be given these points uniformly; such that each node has 10 points, or different points may be given to each node, and this association between points and nodes is maintained.

The point modification means 0906 has a function to modify the points maintained by the point maintenance means, and can be realized by a CPU, a main memory; and a point modification program, for example.

More specifically, for example, a user is presented with the contents of the bottommost layer nodes that are ordered according to the calculated points by the result indication section, and the user inputs the actual correct answer (the products which the user actually liked if it was a recommendation search, or a cause of the actual trouble if it was a trouble search). When the node ID of the correct answer acquired in this manner is different from the highest point node ID, the point values that is associated in advance with the nodes relating to the link of this node in the bottommost layer are modified to be reduced, while on the other hand, the point values of the nodes relating to the link with the node in the bottommost layer that is the correct answer are modified to be increased.

As another example, the user may be shown the contents of the bottommost layer node that has the highest point value, and the user may input an answer concerning whether this content is correct or not, and if it is "incorrect", then the points associated in advance with the node relating to the link of the node of the bottommost layer may be modified to be reduced.

As another example, instead of modifying the points associated with a node beforehand, a constitution may be used in which the link relations and the contents of the nodes are edited depending on the point calculation and the answer input.

In addition, the search system of this embodiment additionally may have a "point modification means control section", not illustrated. The "point modification means control section" has a function to modify the points that are associated with a node, using all or part of the search words acquired by the search word acquisition section either directly or indirectly. For example, the point modification means control section can be realized by a CPU, a main memory, and a point modification means control program.

Specifically, for example, modification can be performed by deciding large and small values for point modification values directly according to the number of search words included in the nodes, or the modified value can be indirectly determined and modified using a factor (e.g., a factor that is high for a noun or verb that relates closely to the search target) indicating importance set for a search word beforehand.

<Process Flow>

Figure 10:
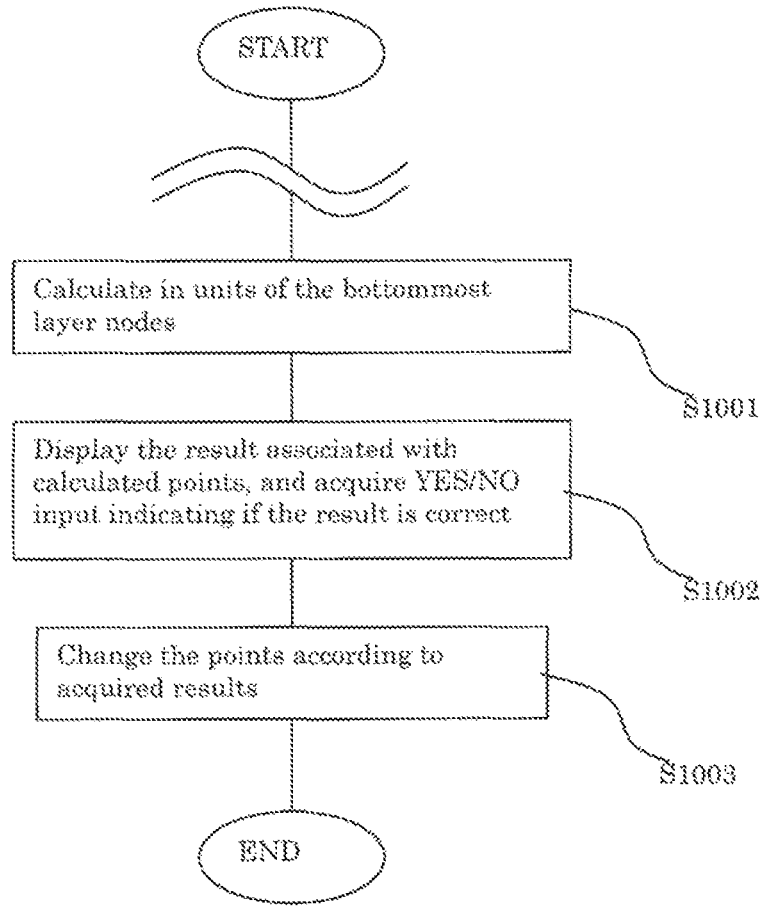
FIG. 10 A flow chart that shows an example of the flow of the processing in the search system embodiment 2

FIG. 10 is flow chart showing an example of the flow of the processing in the search system of this embodiment. In addition, the steps shown below may be executed by each piece of hardware constituting the computer such as described above, or a program may be recorded on a medium and used to cause each step to be executed, by controlling a computer. In addition, the steps relating to the point calculation processing of the bottommost layer nodes are the same as those described in the embodiment described above, and therefore a description thereof is omitted.

As shown in this figure, through the processing described in embodiment 1, the points are calculated in units of the nodes of the bottommost layer (step S1001). Search results are displayed depending on the acquired points, and input of an answer to show whether the result is a correct answer is received (step S1002). The points are then modified depending on the answer input (step S1003).

As described above, in this search system of the present embodiment, the points associated with nodes in a database beforehand can be modified appropriately by the feedback of search results, and therefore the rate of matching in the search results can be improved.

Figure 11A:
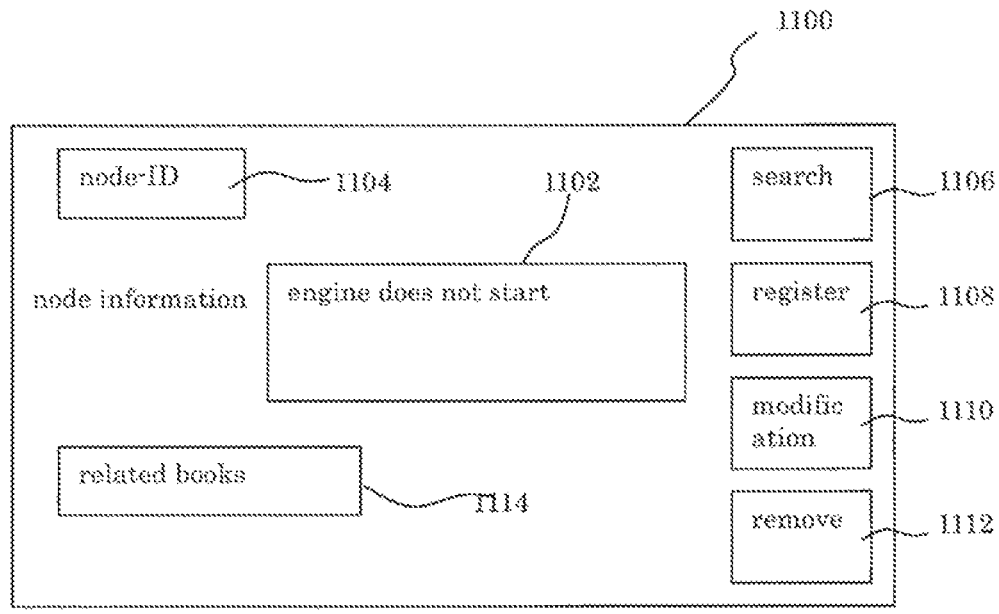
FIG. 11A A figure that shows an example of the node contents editing screen for editing the contents of the node FIG. 11B A figure that shows an example of the link editing screen for editing the connection between the nodes FIG. 12 A figure that shows an example of the function blocks in the search system of embodiment 3
Figure 11B:
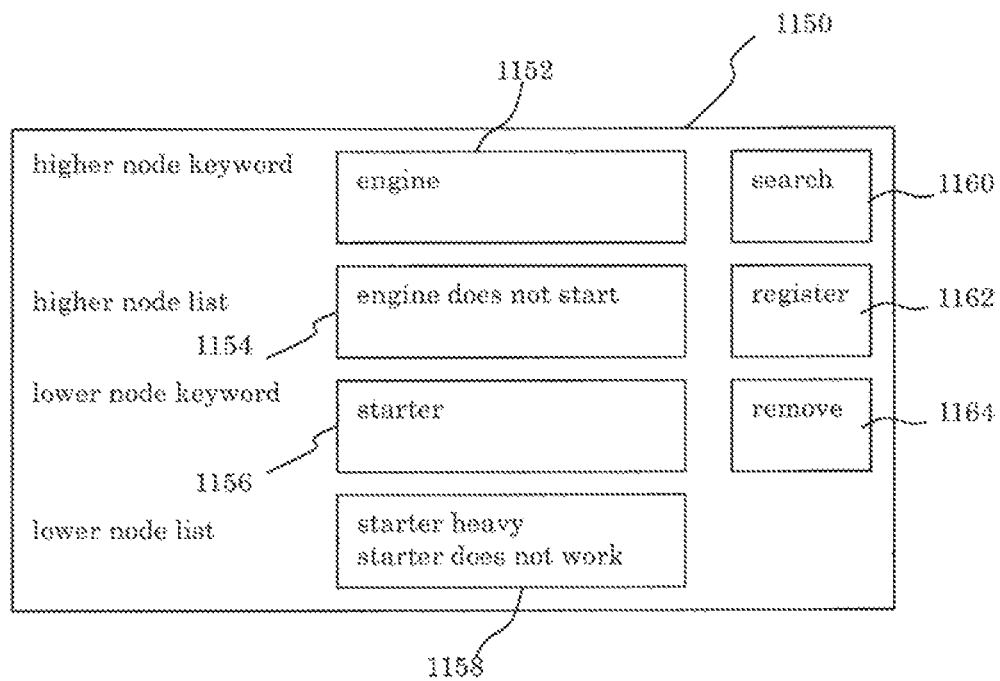

The search systems 0200 and 0900 explained using FIG. 2 and FIG. 9 may have a node contents editing means to edit the contents of nodes maintained by the forward network structure information maintenance section, and a link editing means to edit the connections (links) between the nodes. FIG. 11A shows an example of a node contents editing screen 1100 to make a new node and to edit the contents of the node. In addition, FIG. 11B shows an example of a link editing screen 1150 to edit the connection between the nodes.

The node contents editing screen 1100 has a node attribute entry section 1102, a node ID indication section 1104, a search button 1106, a registration button 1108, a modification button 1110, a deletion button 1112, and a reference entry section 1114. The node contents editing means lets the user (e.g., an expert) input the information "engine does not start" as content of the nodes into the node entry section 1102 and adds a unique ID for this input content. The node contents editing means, for example, adds the node ID by having the user click the registration button 1108 in the editing screen 1100, and may store the node ID and contents of the node in the table described in FIG. 3A or FIG. 3B. This example of the node contents editing means has a function to search the contents of a stored node and a function to modify and to delete these contents.

The node contents editing means may have a function to let the forward network structure information maintenance section record additional information in conjunction with the contents of the node to be registered. For example, when there are books related to the contents of the node, the node contents editing means lets the user input reference information (book title, author name, reference page, etc.) of the related book into reference entry section 1114 and records the information that was input in the forward network structure information maintenance section, in correspondence to the node.

The link editing screen 1150 has a higher node keyword input section 1152, a higher node list indication section 1154, a lower node keyword input section 1156, a lower node list indication section 1158, a search button 1160, a registration button 1162, and a deletion button 1164. The link editing means lets a user identify nodes of the higher layers or of the lower layers that are connected to the target node, to add, change, or modify the connections of the nodes. In this example, the link, editing means identifies the node including a keyword input into the higher node keyword input section 1152, and displays a list of identified higher nodes in the higher node list display section 1154. Similarly, the link editing means displays a list of lower nodes in the lower node list display section 1158. Furthermore, a connection is formed between a lower node and a chosen higher node when a user clicks the registration button 1160. In this way, the link editing means lets a user choose a higher node and a lower node to be connected to each other.

In the example of FIG. 11B, the user inputs the information such as "engine" for a higher node keyword and "starters" for a lower node keyword, in order to search the nodes. When the user clicks the search button 1160 in a node editing screen, a list of the node information matching the higher node keyword, such as "engine does not start" is displayed in a higher node list. As for the registration of the link, when "engine does not start" is chosen from the higher node list and "starter is heavy" is chosen from the lower node list and the registration button 1162 is clicked, the link table of FIG. 3A or FIG. 3B is created. As for the deletion of a link, a part of the node information is entered, and by clicking the search button 1160, the link table and node table in FIG. 3A or FIG. 3B are searched. The node list is then displayed, the user selects a higher node of the higher node list and a lower node of the lower node list, and the deletion is executed by clicking the deletion button 1164.

Figure 12:
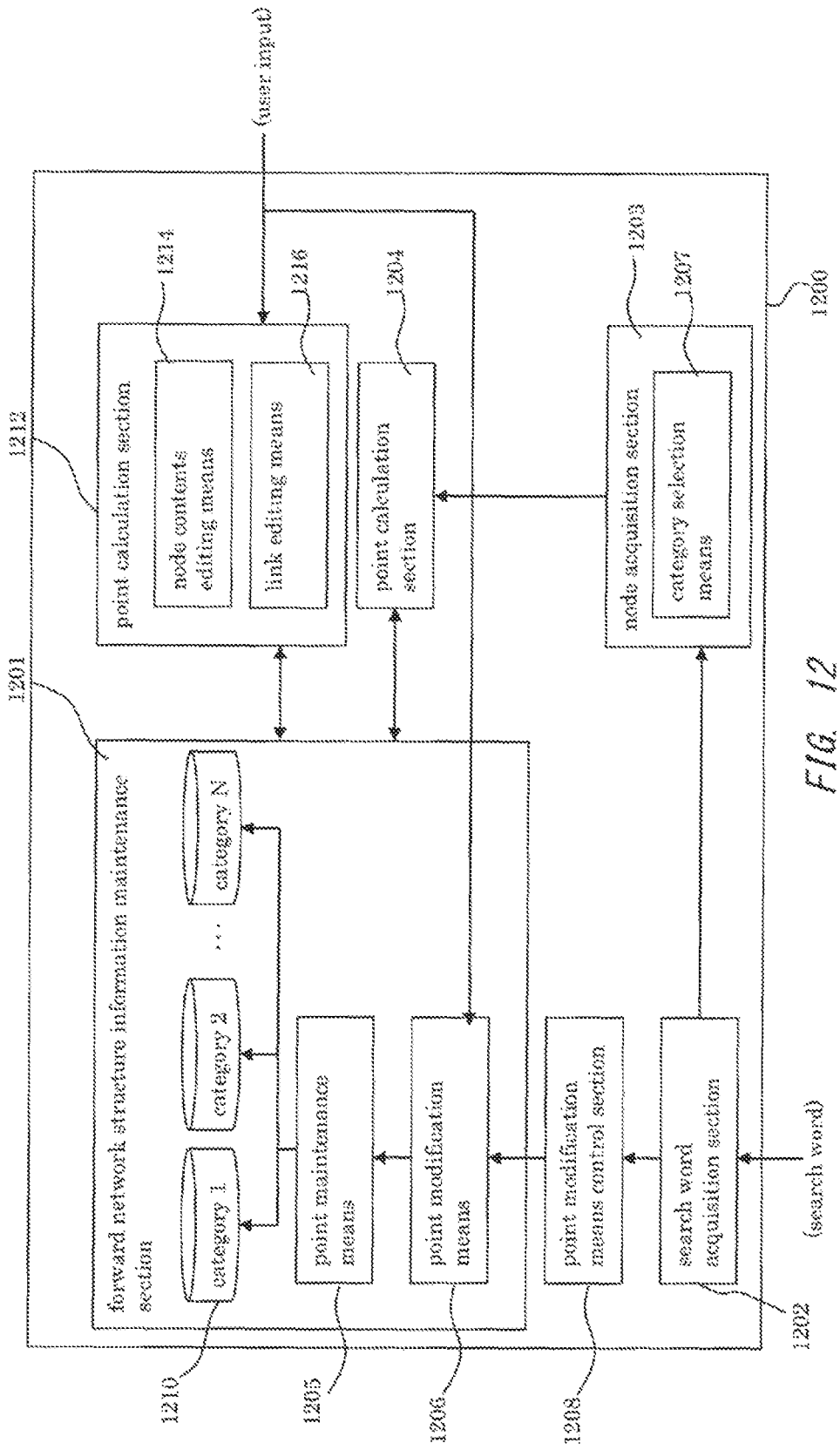

FIG. 12 shows an example of the function blocks in the search system 1200 of embodiment 3. The search systems described in embodiment 1 and embodiment 2 have a case example database for one category, which is "trouble of a vehicle", but this search system 1200 differs from these embodiments by having a plurality of case example databases relating to a plurality of categories.

The search system 1200 comprises a forward network structure information maintenance section 1201, a search word acquisition section 1202, a node acquisition section 1203, a point calculation section 1204, a point modification means control section 1208, and an editing section 1212. The forward network structure information maintenance section 1201 has a point maintenance means 1205, a point modification means 1206, and a plurality of memory means 1210. For example, the memory means 1210 is an HDD. The node acquisition section 1203 has a category selecting means 1207, an editing section 1212, and a node contents editing means 1214.

In addition, the search word acquisition section 1202, node acquisition section 1203, point calculation section 1204, point maintenance means 1205, point modification means 1206, and point modification means control section 1208 have functions similar to those of the forward network structure information maintenance section 0201, search word acquisition section 0202, node acquisition section 0203, and point calculation section 0204 explained in embodiment 1, and the point maintenance means 0905, point modification means 0906, and point modification means control section (not shown) explained in embodiment 2. Furthermore, the node contents editing means 1214 and link editing means 1216 have functions similar to those of the node contents editing means and link editing means explained in FIG. 111A and FIG. 11B. Therefore, explanation of these components is omitted.

The forward network structure information maintenance section 1201 stores a plurality of pieces of forward network structure information. In this example, the forward network structure information is stored in the plurality of memory means 1210 for every category. For example, the forward network structure information is classified in categories such as "disease of an infant", "car", and "plant". Each node included in a category has the information of this category as node information beforehand.

When a search word is input, the node acquisition section 1203 acquires a node including all or part of the search words acquired by the search word acquisition section 1202. When the node acquisition section 1203 acquires a plurality of nodes included in a plurality of categories, the category selection means 1207 identifies the category that each acquired node belongs to and shows this information to the user. For example, the category selection means 1207 may display a list of identified categories corresponding to a chosen category. When a user selects a desired category from among the list of displayed categories, the category selection means 1207 identifies the forward network structure information, which is a database corresponding to the selected category, the node acquisition section 1203, in the subsequent processing, acquires the nodes from the forward network structure information corresponding to the identified category, and the point calculation section 1204 calculates the points in the manner described above. A high-precision search can be performed in this way. Furthermore, searches in multiple fields or categories can be processed simultaneously in parallel, by using a plurality of servers configured to process each category. For example, in a case where a search word is included in a plurality of categories, the category selection means 1207 may perform the search in each of these categories simultaneously. In this case, the forward network structure information maintenance section 1201 may include a plurality of pieces of forward network structure information divided according to predetermined categories, the category selection means 1207 may select the pieces of forward network structure information corresponding to these categories, and the point calculation section 1204 may perform calculation using the selected pieces of forward network structure information. For example, if the search word is "rash", the search can be performed in a plurality of specialized categories such as "makeup products", "dermatology", "internal illness", or "cancer", and a variety of unexpected results can be presented to the user.

Figure 13:
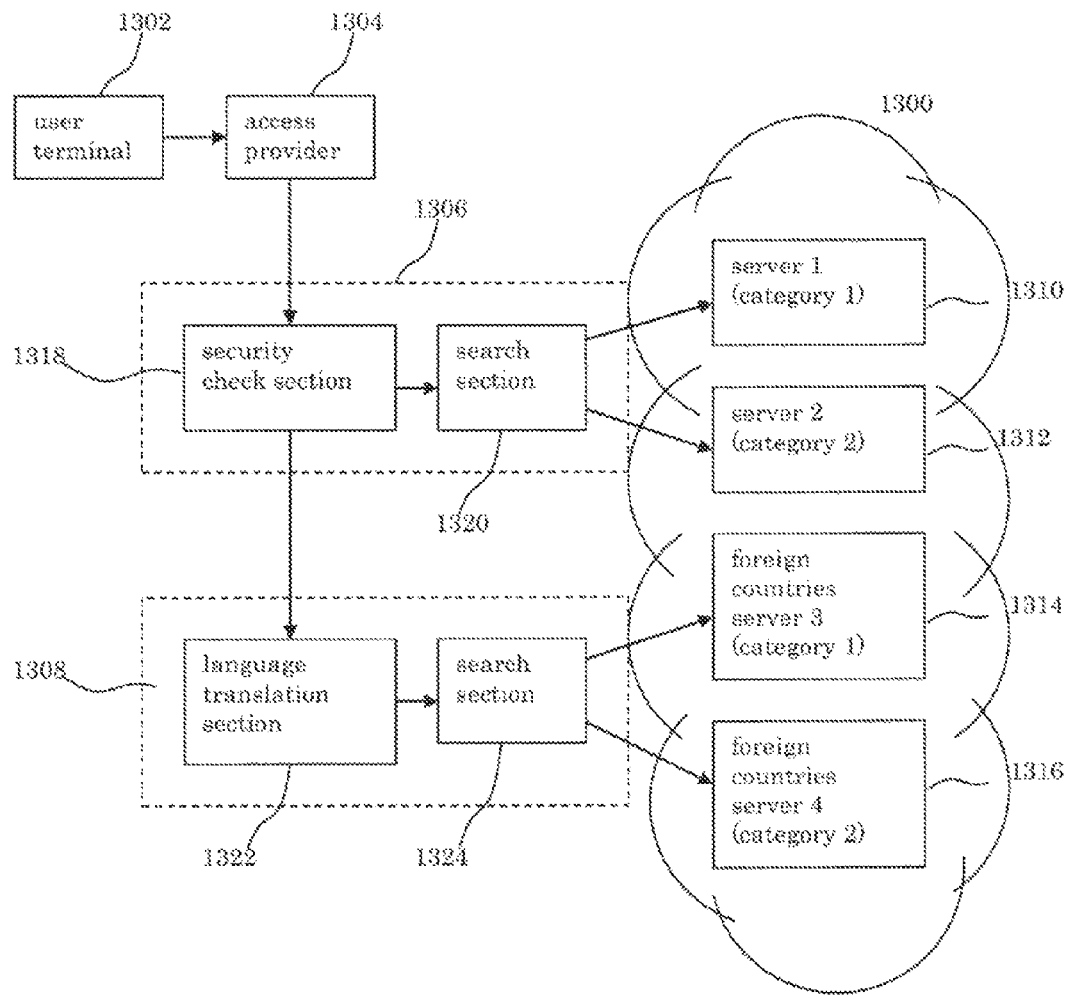
FIG. 13 A figure that shows an example of the search system using the cloud

FIG. 13 shows an example of the search system using the cloud. The search system 1300 includes a user terminal 1302, an access provider 1304, a search server 1306 for Japanese language, a search server 1308 for foreign languages, and a plurality of servers 1310-1316. The search server 1306 for Japanese language is a server to search in the Japanese language and has a security check section 1318 and a search section 1320. The search server 1306 for Japanese language and the search server 1308 for foreign languages may be located in Japan or may be located in a foreign country; and each server may be located in a different country.

The search section 1320 includes a search word acquisition section 1202, a node acquisition section 1203, a point calculation section 1204, and an editing section 1212 that have been explained above. The previously described plurality of pieces of forward network structure information included in the forward network structure information maintenance section 1201 are installed in the different servers 1310 and 1312 according to each category. The search server 1308 for foreign languages is a server to perform searches in foreign languages, and has a translation section 1322 and a search section 1324. The search section 1324 includes a search word acquisition section 1202, a node acquisition section 1203, a point calculation section 1204, and an editing section 1212.

In this example, the previously described plurality of pieces of forward network structure information included in the forward network structure information maintenance section 1201 are installed in the different servers 1310-1316 according to each category. Furthermore, the content of nodes included in the forward network structure information of the same category is created in different languages, and is stored in different servers according to each language. In this case, the servers 1310-1316 may each be installed in the country corresponding to the language thereof, or may be installed in the country where the search words are input.

In this example, when the security check section 1318 receives an access request from the user terminal 1302 through the access provider 1304, the security check section 1318 performs the login processing to the search system. The translation section 1322 translates the search word of a predetermined language input from the user terminal 1302 into other languages and transmits these translated words to the search word acquisition section 1202 of the search section 1324. Thus, the search section 1324 can perform a search using the forward network structure information containing nodes that were created in a foreign language and stored in the overseas servers 1314 and 1316.

The search section 1320 makes an inquiry about an input search word to each server 1310-1316. When a search word matches one category, the search section 1320 performs the point calculation process, and the user terminal 1302 displays the result. On the other hand, when the search word matches a plurality of categories, the search section 1320 lets the user terminal 1302 display the list of matching plurality of categories, and the user terminal 1302 lets a user select a category to perform the point calculation process. In this way, useless processing is reduced and the user can get the needed result quickly. In addition, the search section

1324 may have a function similar to that of the search section 1320. In addition, this system may be opened to the public on the Internet and may link the opinions of agreement or disagreement for each individual person about a specific proposition. In this way; unlike a conventional one-dimensional link such as Twitter, it is possible to comprehend the expansion and directional trend of an argument in a two-dimensional visual manner.

The security check section 1318, search section 1320, search section 1324, and translation section 1322 are located in two different servers in this example, but these sections may instead be implemented in one server, or may be implemented in three or more servers. In addition, the country where a server is located is not limited to any particular country.

The above explained a search system of this invention using embodiments 1 to 3. However, the search technology used by the search system of this invention is not limited to a direct search to identify "a cause" that causes "trouble". For example, the search system may compile existing theses into a database with the forward network structure and examine the connections (links) between nodes, so that researchers can use this system as a search tool for finding a new study proposition by identifying something that is lacking in the connections between nodes. A portion lacking in the links may be confirmed by displaying an error message to a user, or this portion may be detected automatically by using an algorithm. The tacking portion of a link may be compensated with an association of similar words by using a thesaurus, or by using "number of keyword accesses" as association information, in order to analyze the correlation coefficient between search words by factor analysis of multivariate statistics, thereby automatically detecting missing links. In addition, looping is not permitted when forming a link, because the connections (links) between nodes in the forward network structure information are always formed in one direction toward a lower layer from a higher layer. The link editing means 1216 described above may be constructed such that an error message is displayed when trying to form a connection toward a node in a higher layer from a lower layer node. Thus, it is possible to use the link editing means 1216 to perform a loop check in complex logic.

The present invention has been described using the embodiments shown above, but the technical range of this invention is not limited to the embodiments described above. It is apparent to those skilled in the art that it is possible to make a variety of changes or improvements to the embodiments described above. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A non-transitory computer-readable recording medium on which is recorded instructions, the instructions executable by a processor to cause the processor to perform operations comprising:

maintaining forward network structure information that, with stages arranged in a multilayer structure and each stage including one or more nodes associated with one or more words and associated in whole or in part with a point, connects nodes included in different layers with each other, in order from a higher layer toward a lower layer in a network state;

acquiring one or more search words to use for a search;

acquiring a node including all or part of the acquired search words and converting the acquired search words into a point;

using the forward network structure information to calculate points by sequentially adding together in a manner to inherit points, in node units of each layer, the points associated with the acquired node along all of the paths connected by these points from a topmost layer to the node of a predetermined layer; and displaying the result obtained by ordering all or part of the nodes in the predetermined layer, by using the points that have been calculated for each node in the predetermined layer.

2. The non-transitory computer-readable medium according to claim 1, wherein among the nodes forming the multilayer structure connections are formed between nodes of different layers and no connections are formed between nodes in the same layer;

each of the connections is formed only toward a node include in a lower layer from a node included in a higher layer; and at least one of the nodes has one or more features selected from the group consisting of:

connections formed to the node from two or more nodes included in the same higher layer;

connections formed to the node from nodes included in different higher layers; and one or more connections formed to the node from nodes of a higher layer that skip over one or more intervening layers.

3. The non-transitory computer-readable medium according to claim 1, wherein among the nodes forming the multilayer structure, nodes of higher layers are connected toward nodes of lower layers by the one or more words in a manner to have a cause and effect or effect and cause relationship, or the nodes of the lower layers are connected toward the nodes of the higher layers by the one or more words.

4. The non-transitory computer-readable medium according to claim 1, wherein the instructions cause the processor to perform operations further comprising excluding opposite-direction connections, which are a cause of closed loops when tracing the connections of the nodes at the time of a search.

5. The non-transitory computer-readable medium according to claim 1, wherein the the instructions cause the processor to perform operations further comprising identifying, among a plurality of paths tracing nodes connected to the acquired node from the topmost layer to a predetermined layer in the forward network structure information, the node associated with the largest point value in the predetermined layer and all of the paths from the topmost layer to the identified node.

6. The non-transitory computer-readable medium according to claim 1, wherein the instructions cause the processor to perform operations further comprising:

displaying, as a list for each node of a predetermined layer, one or more words associated with nodes of the higher layers and the lower layers that are connected to the nodes of the predetermined layer and displaying all of the paths from the topmost layer to the identified node.

7. The non-transitory computer-readable medium according to claim 1, wherein the instructions cause the processor to perform operations further comprising determining and modifying a point value at a predetermined node, by using all or part of the acquired search words or by using an importance factor set in advance in association with all or part of the acquired search words through user input or feedback of the search result.

8. The non-transitory computer-readable medium according to claim 7, wherein said determining and modifying the point value at the predetermined node includes determining and modifying the point value according to the number of the one or more acquired search words included in the acquired node and weighting the point value depending on the one or more acquired search words.

9. The non-transitory computer-readable recording medium according to claim 1, wherein
at least one node has connections from a plurality of nodes in one or more layers that are higher than the layer of the at least one node, and
the instructions cause the processor to perform operations further comprising, so as to calculate a point of the at least one node having the connections from the plurality of nodes in the one or more higher layers, calculating (i) all of the points calculated in each node of the one or more higher layers and inherited to the at least one node and (ii) the points associated with the at least one node.

10. A search system comprising:
the non-transitory computer-readable medium according to claim 1 and
an interface to directly acquire output from other system control units.

11. A search system comprising:
the non-transitory computer-readable medium according to claim 1; and
a display unit for displaying the result.

12. An apparatus comprising:
a non-transitory computer-readable recording medium on which is recorded data having a data structure that contains a hierarchy of a plurality of nodes and a plurality of layers, wherein
each of the one or more layers has at least one or more nodes,
the nodes are associated with one or more words and associated in whole or in part with a point, and
(i) a connection is formed from each of the at least one or more nodes included in any one of the plurality of layers except the bottommost layer, toward at least one or more nodes included in one or more layers at a lower position than the one layer, and each of the one or more nodes in the one layer is connected toward neither the nodes in the one layer nor nodes in the higher layers, or
(ii) a connection is formed from each of the at least one or more nodes included in any one of the plurality of layers except the topmost layer, toward at least one or more nodes included in one or more layers at a higher position than the one layer, and each of the one or more nodes in the one layer is connected toward neither the nodes in the one layer nor nodes in the lower layers; and
a processor;

wherein the non-transitory computer-readable recording medium further includes instructions recorded thereon, the instructions executable by the processor to cause the processor to perform operations including:
acquiring one or more search words to use for a search,
acquiring a node including all or part of the acquired search words and converting the acquired search words into a point,
using the data structure to calculate points by sequentially adding together in a manner to inherit points, in node units of each layer, the points associated with the acquired node along all of the paths connected by these points from a topmost layer to the node of a predetermined layer, and
displaying the result obtained by ordering all or part of the nodes in the predetermined layer, by using the points that have been calculated for each node in the predetermined layer.

13. A non-transitory computer-readable recording medium on which is recorded instructions, the instructions executable by a processor to cause the processor to perform operations comprising:
displaying a screen for acquiring one or more search words to use for a search; and,
upon receiving input of a search word from a user, acquiring points from a forward network structure information maintenance section that, with stages arranged in a multilayer structure and each stage including one or more nodes associated with one or more words and associated in whole or in part with a point, maintains forward network structure information that connects nodes included in different layers with each other, in order from a higher layer toward a lower layer in a network state, where the points correspond to a node including all or part of the input search words that are acquired, calculating points by sequentially adding together in a manner to inherit points, in node units of each layer, the points associated with the nodes along all of the paths connected by these points from a topmost layer to the node of a predetermined layer, and displaying a result of ordering all or part of the nodes of the predetermined layer using the acquired points.

14. The non-transitory computer-readable recording medium according to claim 13, wherein among the nodes forming the multilayer structure,
(i) a connection is formed from each of the at least one or more nodes included in any one of the plurality of layers except the bottommost layer, toward at least one or more nodes included in one or more layers at a lower position than the one layer, and each of the one or more nodes in the one layer is connected toward neither the nodes in the one layer nor nodes in the higher layers, or
(ii) a connection is formed from each of the at least one or more nodes included in any one of the plurality of layers except the topmost layer, toward at least one or more nodes included in one or more layers at a higher position than the one layer, and each of the one or more nodes in the one layer is connected toward neither the nodes in the one layer nor nodes in the lower layers.

15. A search system comprising:
the non-transitory computer-readable medium according to claim 13; and
a processor operable to execute the instructions recorded therein.

16. A method comprising:
maintaining forward network structure information that, with stages arranged in a multilayer structure and each stage including one or more nodes associated with one or more words and associated in whole or in part with a point, connects nodes included in different layers with each other, in order from a higher layer toward a lower layer in a network state;

acquiring one or more search word to use for a search;

acquiring a node including all or part of the acquired search words and converting the acquired search words into a point;

using the forward network structure information to calculate points by sequentially adding together in a manner to inherit points, in node units of each layer, the points associated with the acquired node along all of the paths connected by these points from a topmost layer to the node of a predetermined layer; and displaying the result obtained by ordering all or part of the nodes in the predetermined layer, by using the points that have been calculated for each node in the predetermined layer.

17. The method according to claim 16, wherein among the nodes forming the multilayer structure information, (i) a connection is formed from each of the at least one or more nodes included in any one of the plurality of layers except the bottommost layer, toward at least one or more nodes included in one or more layers at a lower position than the one layer, and each of the one or more nodes in the one layer is connected toward neither the nodes in the one layer nor nodes in the higher layers, or (ii) a connection is formed from each of the at least one or more nodes included in any one of the plurality of layers except the topmost layer, toward at least one or more nodes included in one or more layers at a higher position than the one layer, and each of the one or more nodes in the one layer is connected toward neither the nodes in the one layer nor nodes in the lower layers.

* * * * *